United States Patent
Peng et al.

(10) Patent No.: US 8,953,903 B2
(45) Date of Patent: Feb. 10, 2015

(54) METHOD OF MULTI-FRAME IMAGE NOISE REDUCTION

(75) Inventors: Shih-Yuan Peng, New Taipei (TW); Chung-Ta Wu, Taichung (TW)

(73) Assignee: Altek Corporation, Hsinchu (TW)

( * ) Notice: Subject to any disclaimer, the term of this patent is extended or adjusted under 35 U.S.C. 154(b) by 743 days.

(21) Appl. No.: 13/205,638

(22) Filed: Aug. 9, 2011

(65) Prior Publication Data
US 2012/0275710 A1  Nov. 1, 2012

(30) Foreign Application Priority Data
Apr. 28, 2011  (TW) .............................. 100114933 A

(51) Int. Cl.
| G06K 9/40 | (2006.01) |
| G06K 9/56 | (2006.01) |
| G06K 9/32 | (2006.01) |
| H04N 5/00 | (2011.01) |
| G06T 5/00 | (2006.01) |
| G06T 7/00 | (2006.01) |
| G06T 5/20 | (2006.01) |
| H04N 5/213 | (2006.01) |
| H04N 5/14 | (2006.01) |

(52) U.S. Cl.
CPC .............. *G06T 5/002* (2013.01); *G06T 7/0085* (2013.01); *G06T 5/20* (2013.01); *H04N 5/213* (2013.01); *H04N 5/142* (2013.01); *G06T 2207/10016* (2013.01); *G06T 2207/20032* (2013.01); *G06T 2207/20182* (2013.01)
USPC ........... 382/275; 382/205; 382/261; 382/294; 348/606

(58) Field of Classification Search
None
See application file for complete search history.

(56) References Cited

U.S. PATENT DOCUMENTS

| 5,446,501 A | * | 8/1995 | Takemoto et al. | ............. 348/620 |
| 5,473,384 A | * | 12/1995 | Jayant et al. | .................. 348/470 |
| 7,899,248 B2 | | 3/2011 | Liu | |

(Continued)

FOREIGN PATENT DOCUMENTS

| CN | 1131880 | 9/1996 |
| CN | 1761286 | 4/2006 |

(Continued)

OTHER PUBLICATIONS

Xue, Gang, "Temporal Denoising of High Resolution Video" (2009). Open Access Dissertations and Theses.Paper 4071.*

(Continued)

*Primary Examiner* — Randolph I Chu
*Assistant Examiner* — Nathan Bloom
(74) *Attorney, Agent, or Firm* — Jianq Chyun IP Office

(57) ABSTRACT

A method of multi-frame image noise reduction suitable for an image-capturing device includes following steps: obtaining a current frame and multiple reference frames; defining a mask and a target point in the mask; judging whether the target point pixel of the current frame is on an edge according to an edge map of the frame; when the pixel is on the edge, using the pixels in the reference frames on the edge to calculate a replacement result; when the target point pixel is not on the edge, using the pixels in the reference frames surrounding the target point to calculate a replacement result; after that, generating a pixel corresponding to the position of the target point in an output image according to the replacement result; further, moving the mask and going back to judge whether the pixel of the target point of the current frame is on the edge.

9 Claims, 6 Drawing Sheets

(56) References Cited

U.S. PATENT DOCUMENTS

| | | |
|---|---|---|
| 2005/0128355 A1 | 6/2005 | Kang et al. |
| 2005/0135700 A1* | 6/2005 | Anderson ............... 382/261 |
| 2006/0285765 A1 | 12/2006 | Chiu |
| 2007/0116373 A1* | 5/2007 | Hwang et al. ............ 382/261 |
| 2007/0195199 A1* | 8/2007 | Chen et al. ............... 348/607 |
| 2009/0041373 A1* | 2/2009 | Incesu et al. ............. 382/264 |
| 2010/0246992 A1 | 9/2010 | Kempf et al. |
| 2013/0004096 A1* | 1/2013 | Goh et al. ............... 382/260 |

FOREIGN PATENT DOCUMENTS

| | | |
|---|---|---|
| CN | 101087365 | 12/2007 |
| CN | 101123680 | 2/2008 |
| CN | 101640809 | 2/2010 |
| CN | 102663708 | 9/2012 |
| EP | 0920221 | 8/2009 |
| TW | 200920146 | 5/2009 |
| TW | 201001335 | 1/2010 |

OTHER PUBLICATIONS

Dugad, Rakesh, and Narendra Ahuja. "Video denoising by combining Kalman and Wiener estimates." Image Processing, 1999. ICIP 99. Proceedings. 1999 International Conference on. vol. 4. IEEE, 1999.*

"Office Action of Taiwan Counterpart Application", issued on Aug. 26, 2014, p. 1-p. 5, in which the listed references were cited.

"Office Action of China Counterpart Application", issued on Apr. 29, 2014, p. 1-p. 6, in which the listed references were cited.

* cited by examiner

M1

| 0 | 0 | 0 | 0 | 0 |
|---|---|---|---|---|
| 0 | 0 | 0 | 0 | 0 |
| -1 | -1 | 4 | -1 | -1 |
| 0 | 0 | 0 | 0 | 0 |
| 0 | 0 | 0 | 0 | 0 |

M2

| 0 | 0 | -1 | 0 | 0 |
|---|---|---|---|---|
| 0 | 0 | -1 | 0 | 0 |
| 0 | 0 | 4 | 0 | 0 |
| 0 | 0 | -1 | 0 | 0 |
| 0 | 0 | -1 | 0 | 0 |

M3

| -1 | 0 | 0 | 0 | 0 |
|---|---|---|---|---|
| 0 | -1 | 0 | 0 | 0 |
| 0 | 0 | 4 | 0 | 0 |
| 0 | 0 | 0 | -1 | 0 |
| 0 | 0 | 0 | 0 | -1 |

M4

| 0 | 0 | 0 | 0 | -1 |
|---|---|---|---|---|
| 0 | 0 | 0 | -1 | 0 |
| 0 | 0 | 4 | 0 | 0 |
| 0 | -1 | 0 | 0 | 0 |
| -1 | 0 | 0 | 0 | 0 |

M5

| 0 | 0 | 0 | 0 | 0 |
|---|---|---|---|---|
| 0 | 0 | 0 | 0 | 0 |
| 0 | 0 | 4 | -1 | -1 |
| 0 | 0 | -1 | 0 | 0 |
| 0 | 0 | -1 | 0 | 0 |

M6

| 0 | 0 | 0 | 0 | 0 |
|---|---|---|---|---|
| 0 | 0 | 0 | 0 | 0 |
| -1 | -1 | 4 | 0 | 0 |
| 0 | 0 | -1 | 0 | 0 |
| 0 | 0 | -1 | 0 | 0 |

M7

| 0 | 0 | -1 | 0 | 0 |
|---|---|---|---|---|
| 0 | 0 | -1 | 0 | 0 |
| -1 | -1 | 4 | 0 | 0 |
| 0 | 0 | 0 | 0 | 0 |
| 0 | 0 | 0 | 0 | 0 |

M8

| 0 | 0 | -1 | 0 | 0 |
|---|---|---|---|---|
| 0 | 0 | -1 | 0 | 0 |
| 0 | 0 | 4 | -1 | -1 |
| 0 | 0 | 0 | 0 | 0 |
| 0 | 0 | 0 | 0 | 0 |

FIG. 8

METHOD OF MULTI-FRAME IMAGE NOISE REDUCTION

CROSS-REFERENCE TO RELATED APPLICATION

This application claims the priority benefit of Taiwan application serial no. 100114933, filed on Apr. 28, 2011. The entirety of the above-mentioned patent application is hereby incorporated by reference herein and made a part of this specification.

BACKGROUND OF THE INVENTION

1. Field of the Invention

The invention generally relates to an image noise reduction method, and more particularly, to a method of multi-frame image noise reduction.

2. Description of Related Art

Usually, image noise can be primarily divided into impulse noise and Gaussian noise. Gaussian noise is usually processed with finite impulse response method (FIR method), i.e., convolution-based method. In terms of processing impulse noise, median filter method is a more effective way. However, the most problematic issue of the median filter method rests in it easily destroys integrity of an edge and also easily makes the edge look indistinct.

The conventional median filter method is applied in three-dimensional noise reduction (3D NR) and has roughly following two schemes. One of the schemes is to set a window with a certain size, followed by performing median filter operation on the pixels in each window of all temporal frames. Another one is to set a window with a certain size, followed by weighting current pixels and then, performing median filter operation on the pixels in each window of all temporal frames. The above-mentioned schemes that performing median filter operation on the pixels in each window of all temporal frames without any judgement on edges would destroy the detail of an edge, and at the boundary between a smooth region and an edge, it possibly occur that the detail of an edge replaces a part of a smooth region; that is, a weird situation may occur that the edge pixels present themselves on a smooth region. Although the above-mentioned second scheme increases the weights of the current pixels, but under the situation without judgement on edge direction and the presence of edge, the risks of destroying the detail and wrongly replacing a part of a smooth region with the edge pixels are still unavoidable.

SUMMARY OF THE INVENTION

Accordingly, the invention is directed to a method of multi-frame image noise reduction capable of keeping the detail of an edge in a frame.

The invention provides a method of multi-frame image noise reduction suitable for an image-capturing device. The method includes following steps. First, a current frame and a plurality of reference frames are obtained. Next, a mask and a target point in the mask are defined. Then, whether or not the pixel of the target point of the current frame is located on an edge is judged according to an edge map of the current frame. When the pixel of the target point is located on the edge, the pixels in the reference frames located on the edge are used to calculate a replacement result; when the pixel of the target point is not located on the edge, the pixels in the reference frames surrounding the target point are used to calculate a replacement result, in which the pixels surrounding the target point are located at a same side of the edge. After that, a pixel corresponding to the position of the target point in an output image is generated according to the replacement result. Further, the mask is moved and the method goes back to the step of judging whether or not the pixel of the target point of the current frame is located on the edge.

In an embodiment of the present invention, the step of calculating a replacement result by using the pixels in the reference frames located on the edge includes following steps: first, determining a representing direction of the edge among a plurality of edge directions according to the contrast of the pixel of the target point over the adjacent pixels; next, respectively calculating a median value of the pixels of the current frame on the representing direction and the pixels of each of the reference frames on the representing direction; then, determining the replacement result according to the median values.

In an embodiment of the present invention, the method of multi-frame image noise reduction further includes determining in auxiliary way the representing direction according to the contrast of a plurality of background pixels in the mask over the pixels on the edge directions in the mask.

In an embodiment of the present invention, the step of determining the replacement result according to the median values includes following steps: first, respectively calculating a background average value of the pixels outside the representing direction of the current frame and the reference frames; next, respectively calculating a difference value between the median values and the background average values; then, respectively calculating a weighting value of the current frame and the reference frames according to the difference values; after that, weighting the median values according to the weighting values so as to determine the replacement result.

In an embodiment of the present invention, the difference values and the weighting values have positive-going relationship with each other.

In an embodiment of the present invention, the step of determining the replacement result according to the median values includes finding out the median of the median values to determine the replacement result.

In an embodiment of the present invention, the step of respectively calculating the median values includes following steps: first, finding out a plurality of effective points on the representing direction according to the edge map; next, respectively calculating the pixels at the effective points of the current frame and the reference frames to serve as the median values.

In an embodiment of the present invention, the step of calculating the replacement result by using the pixels in the reference frames surrounding the target point includes following steps: first, respectively calculating a median value of the pixels surrounding the target point in the reference frames; next, determining the replacement result according to the median values.

In an embodiment of the present invention, the step of determining the replacement result according to the median values includes averaging the median values to determine the replacement result.

In an embodiment of the present invention, the method of multi-frame image noise reduction further includes following steps: first, judging whether or not the pixels of the target point of the reference frames are located on the edge according to the edge maps of the frames; then, discarding the frame if the pixel of the target point of a frame among the reference frames is not located on the edge.

Based on the above depiction, the invention can effectively remove the impulse noise on an edge and the noise of the smooth region and can still keep the detail of an edge.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 8 is a diagram of mask templates respectively corresponding to the edge directions of FIG. 7.

DESCRIPTION OF THE EMBODIMENTS

Figure 1:
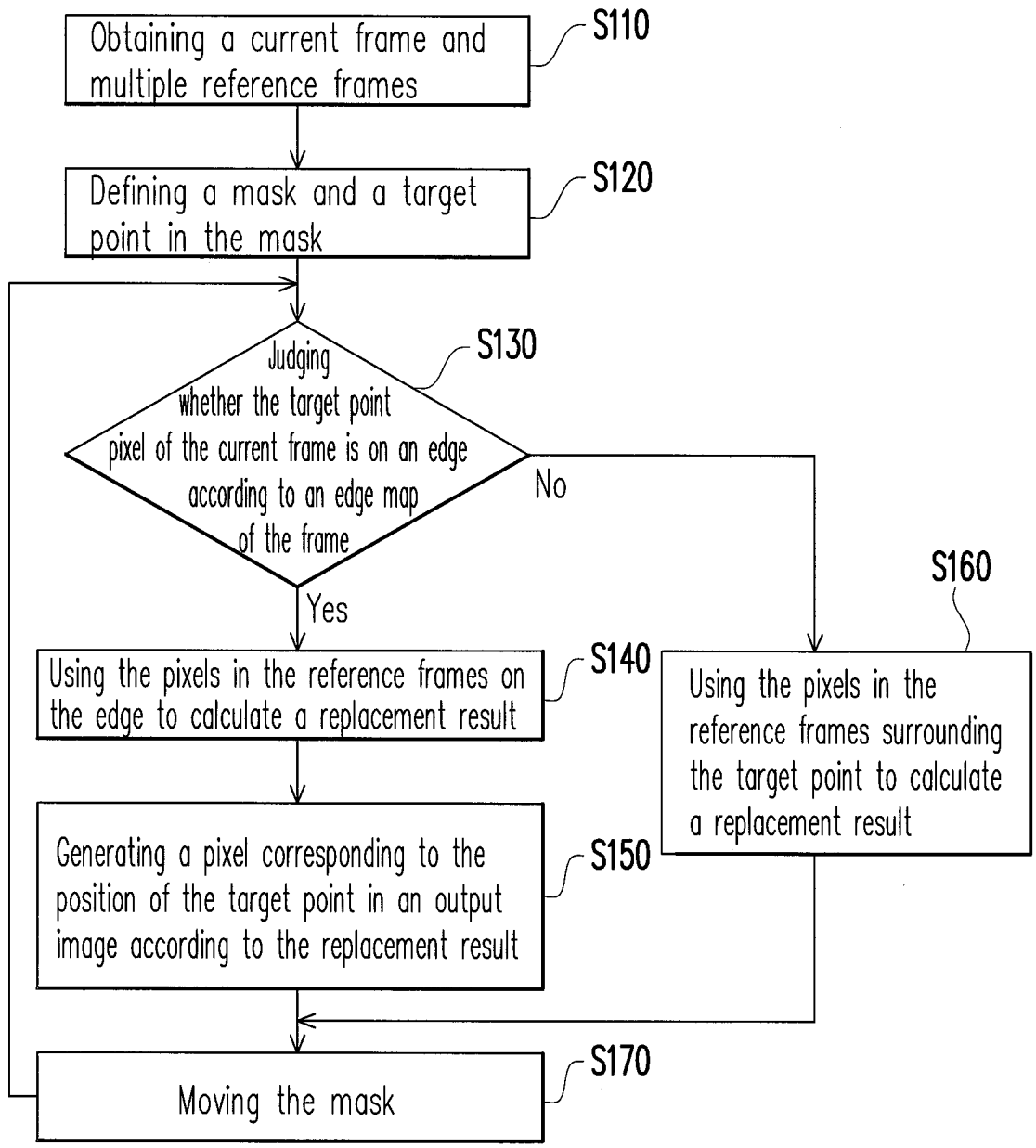
FIG. 1 is a flowchart diagram of the method of multi-frame image noise reduction according to an embodiment of the invention.
Figure 2:
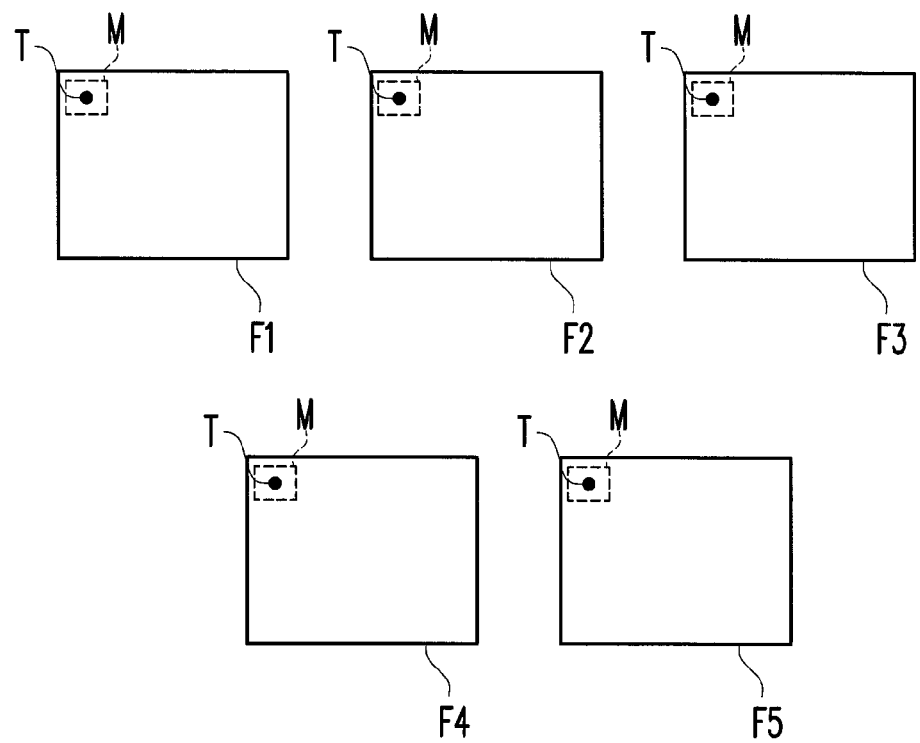
FIG. 2 is a diagram of a plurality of frames according to an embodiment of the invention.

FIG. 1 is a flowchart diagram of the method of multi-frame image noise reduction according to an embodiment of the invention. In the embodiment, the flowchart of FIG. 1 is suitable for image-capturing devices such as digital camera or digital video camera (not shown). FIG. 2 is a diagram of a plurality of frames according to an embodiment of the invention. Referring to FIGS. 1 and 2, first, step S110 is performed that a current frame F3 and a plurality of reference frames F1, F2, F4 and F5 are obtained. Next, step S120 is performed that a mask M and a target point T in the mask M are defined, in which the mask M has a size, for example, 5×5 and the target point T can be the center point of the mask M, which the invention is not limited to. In addition, in the current frame F3 and the reference frames F1, F2, F4 and F5, the mask M can mark out the same corresponding positions of the five frames F1-F5 after motion compensations.

Figure 3:
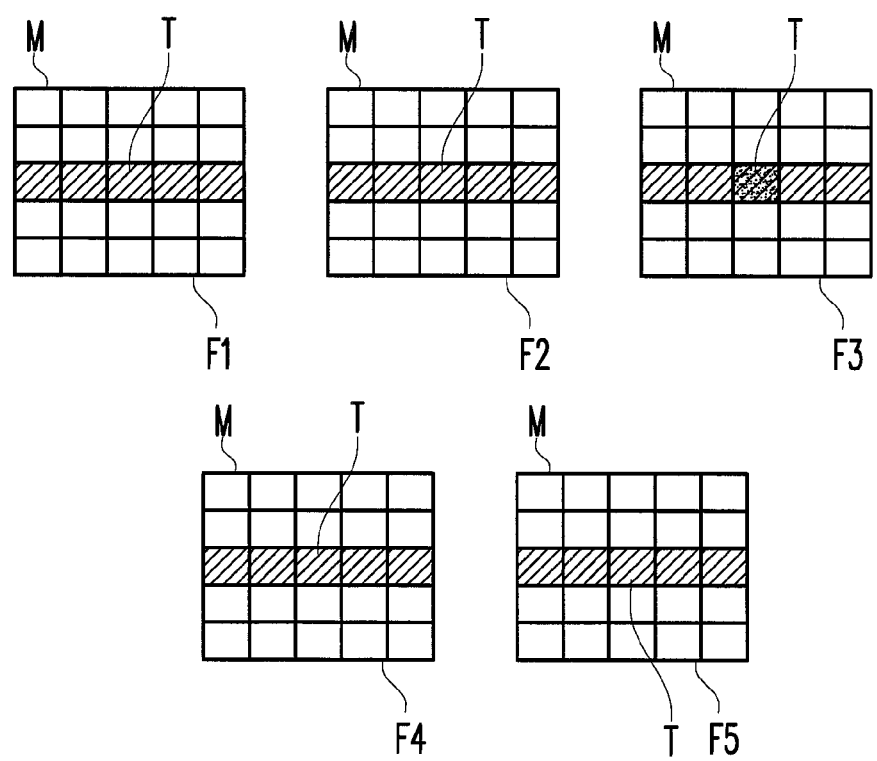
FIG. 3 is a diagram showing target points are located on the edges.

Then, step S130 is performed that it is judged whether or not the pixel of the target point T of the current frame F3 is located on an edge according to the edge map (not shown) of the current frame F3. FIG. 3 is a diagram showing target points are located on the edges. Referring to FIG. 3, the edges herein respectively occupy, for example, five pixels of the centre part of the mask M. When the pixel of the target point T of the current frame F3 is located on an edge, step S140 is performed that the pixels in the reference frames F1, F2, F4 and F5 located on the edges are used to calculate a replacement result, that is, the five pixels of the centre part respectively in the reference frames F1, F2, F4 and F5 are used to calculate a replacement result. Then, step S150 is performed that a pixel corresponding to the position of the target point T in an output image is generated according to the replacement result. Further, step S170 is performed that the mask M is moved and the method goes back to step S130.

Figure 4:
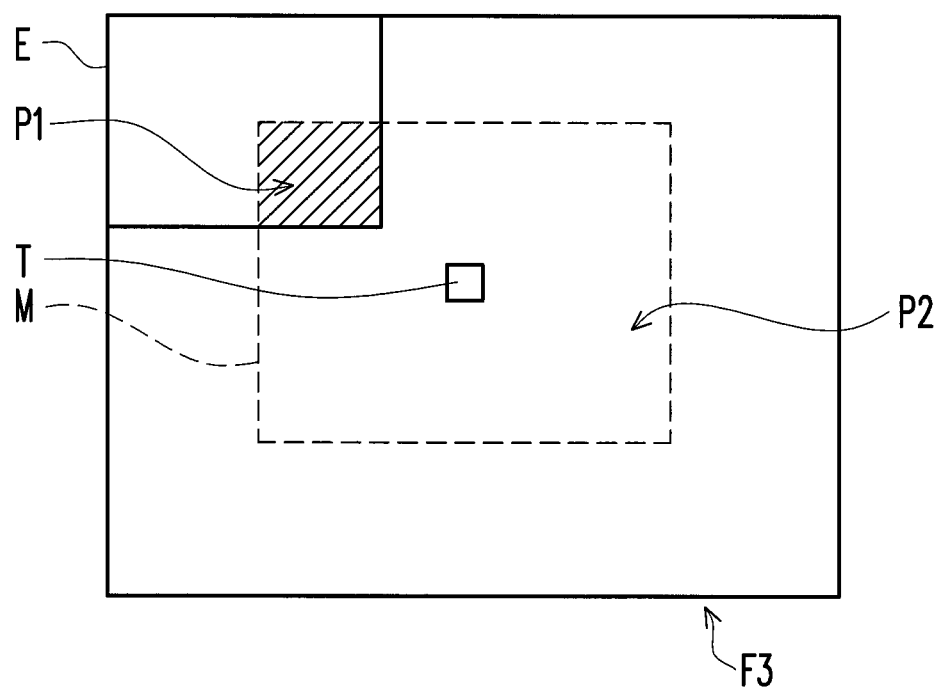
FIG. 4 is a diagram showing a target point is not located on the edge.

FIG. 4 is a diagram showing a target point is not located on the edge. Referring to FIG. 4, contrary to step S140, when the pixel of the target point T of the current frame F3 is not located on the edge E, step S160 is performed that the pixels in the reference frames F1, F2, F4 surrounding the target point T are used to calculate a replacement result, in which the pixels surrounding the target point T are located at a same side P2 of the edge E. That is to say the pixels located at the other side of the edge are not used so as to avoid a wrong replacement result.

Then, step S150 is performed that a pixel corresponding to the position of the target point T in an output image is generated according to the replacement result. Further, step S170 is performed that the mask is moved and the method goes back to step S130. It should be noted that when the target point T of the mask M in the current frame F3 is judged out to belong to the edge, only the pixels on the edge are used to compensate the pixel of the target point T; when the target point T of the mask M in the current frame F3 is judged out not to belong to the edge, only the pixels surrounding the target point T are used to compensate the pixel of the target point T. In this way, the invention not only can reduce image noise, but also can avoid destroying the edge and the surrounding pixels adjacent to the edge. As a result, the detail of the edge is kept.

Figure 5:
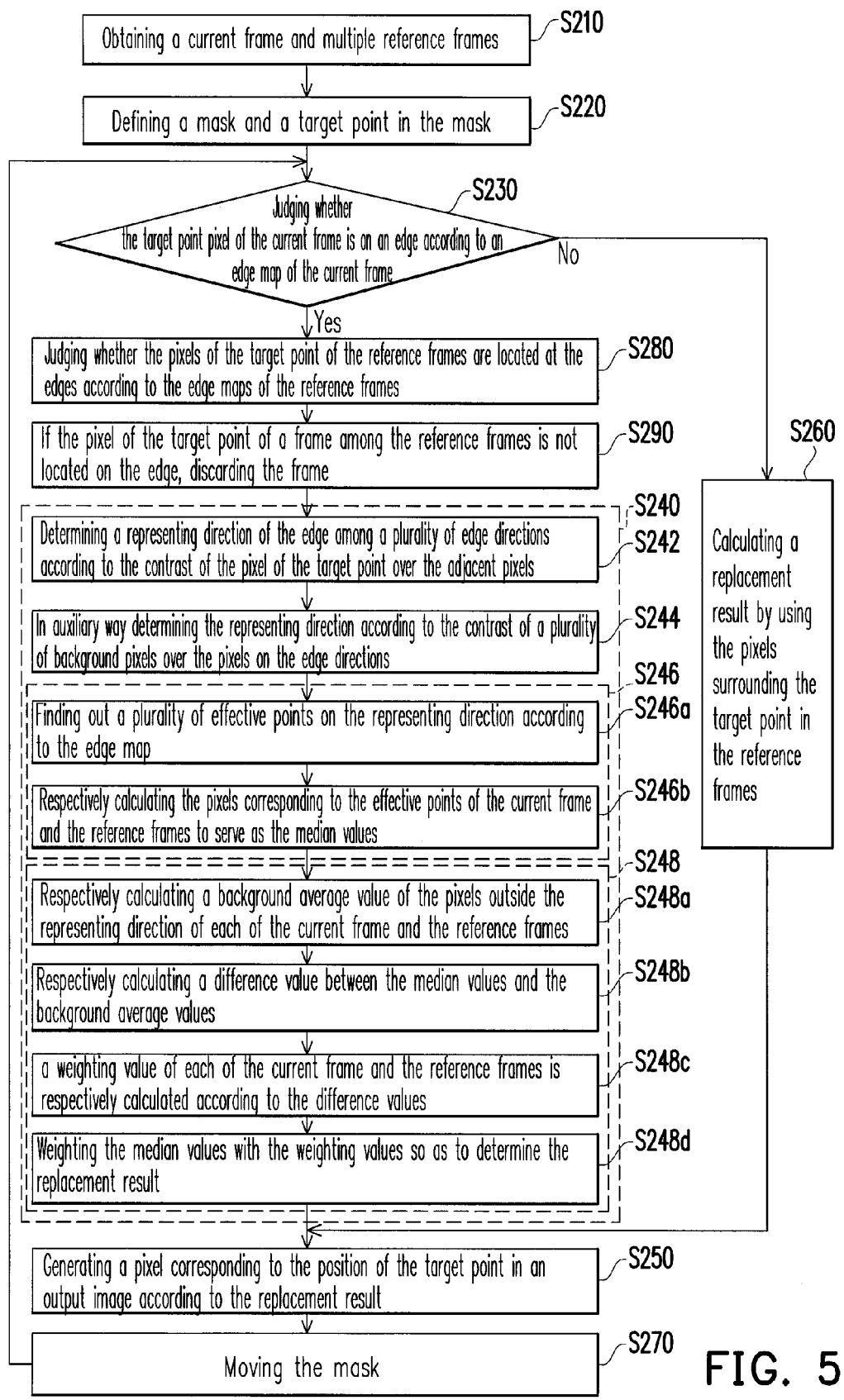
FIG. 5 is a flowchart diagram of the method of multi-frame image noise reduction according to another embodiment of the invention.

FIG. 5 is a flowchart diagram of the method of multi-frame image noise reduction according to another embodiment of the invention. For simplicity, the flowchart of FIG. 5 is depicted in association with the multiple frames of FIG. 2. First, step S210 is performed that a current frame F3 and a plurality of reference frames F1, F2, F4 and F5 are obtained. Next, step S220 is performed that a mask M and a target point T in the mask M are defined, in which the mask M has a size, for example, 5×5 and the target point T can be the centre point of the mask M, which the invention is not limited to. In addition, in the current frame F3 and the reference frames F1, F2, F4 and F5, the mask M after motion compensations can be located at different positions.

Figure 6:
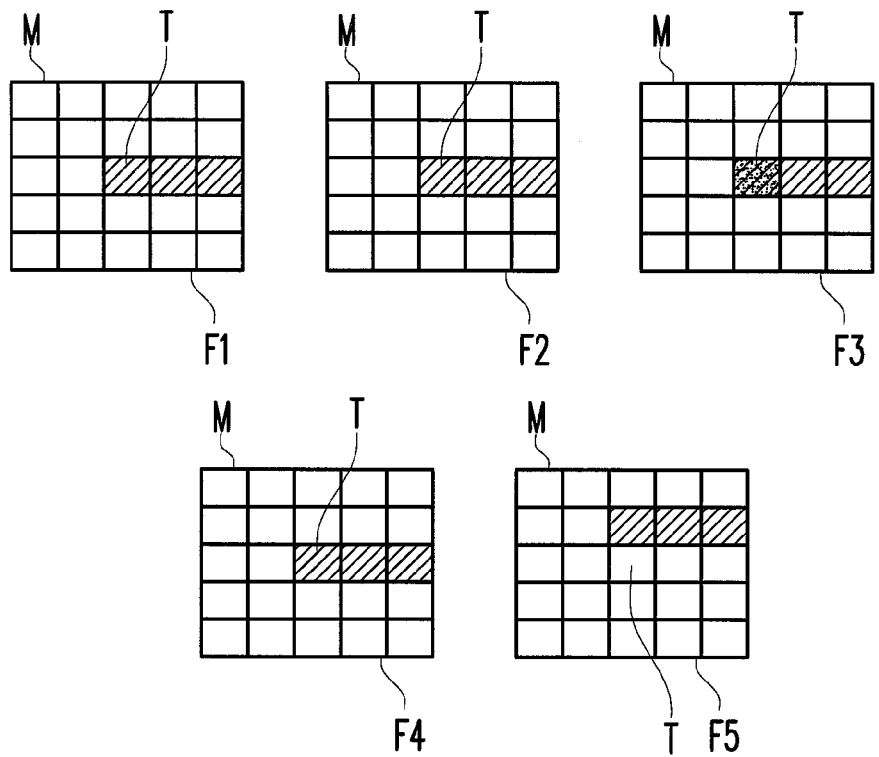
FIG. 6 is a diagram showing target points are located on local edges.

Then, step S230 is performed that it is judged whether or not the pixel of the target point T of the current frame F3 is located on an edge according to the edge map (not shown) of the current frame F3. FIG. 6 is a diagram showing target points are located on local edges. In comparison with FIG. 3 where the edge occupies all the five pixels of the centre part of the mask M, the edge of FIG. 6 occupies however, for example, three pixels of the centre part of the mask M only. In the embodiment, when the pixel of the target point T of the current frame F3 is located on the edge, it can be firstly affirmed whether or not the motion compensations of the reference frames F1, F2, F4 and F5 meet the requirement. In more details, step S280 is performed that it is judged that whether or not the pixels of the target point T of the reference frames F1, F2, F4 and F5 are located at the edges according to the edge maps of the reference frames F1, F2, F4 and F5. If the pixel of the target point T of a frame among the reference frames F1, F2, F4 and F5 is not located on the edge, step S290 is performed that the frame where the pixel of the target point T is not located on the edge is discarded. For example, in FIG. 6, the reference frame F5 where the pixel of the target point T is not located on the edge, so that the frame F5 is discarded. In this way, it can ensure each of the reference frames F1, F2, F4 and F5 has a relatively correct motion compensation to advance the effect of the following noise reduction operation.

Figure 7:
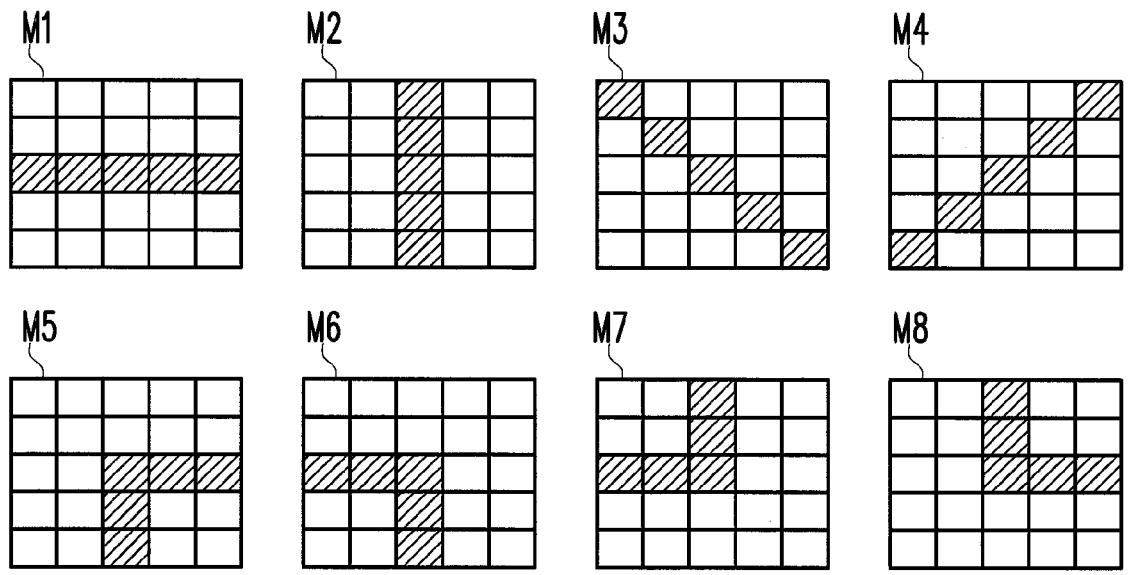
FIG. 7 is a diagram showing a plurality of edge directions.

Then step S240 is performed that a replacement result is calculated by using the pixels on the edges in the reference frames F1, F2 and F4. In more details, step S240 includes a plurality of sub steps S242-S248. FIG. 7 is a diagram showing a plurality of edge directions. Referring to FIG. 7, first, step S242 is performed that a representing direction of the edge is determined among a plurality of edge directions M1-M8 according to the contrast of the pixel of the target point T over the adjacent pixels. FIG. 8 is a diagram of mask templates respectively corresponding to the edge directions of FIG. 7. Referring to FIG. 8, eight mask templates are respectively corresponding to the edge directions M1-M8. After the pixels of the mask M are respectively brought into the eight mask templates, eight gradient values can be calculated, in which the edge direction corresponding to the mask template with the minimum gradient value is the representing direction.

In terms of the horizontal edges of FIG. 3 or FIG. 6, the differences between the pixels on the horizontal direction in the masks M are minimal, so that the minimum gradient value can be calculated out for the mask template corresponding to the edge direction M1. At the time, the contrast of the edge in the mask M on the edge direction M1 is minimal and the edge direction M1 is determined as the representing direction.

In order to increase the reliability of searching the representing direction of edges, it can further affirm the contrast of the edge over the background. When the contrast of the pixels on an edge direction over the background pixels in a mask M is larger, the edge direction is more likely the representing direction. Based on the reason, the embodiment further has step S244 that the representing direction is in auxiliary way determined according to the contrast of a plurality of background pixels over the pixels on the edge directions M1-M8. In more strict methodology, only an edge direction found out by meeting both the two conditions of steps S242 and S244 can serve as one for the following noise reduction processing so as to reduce the possibility of destroying the detail due to noise reduction processing.

For example, the average value of all pixels in a mask M is calculated and the result serves as background average value. Then, the average values of five pixels on each of the edge directions M1-M8 are calculated. After that, the average values of each of the edge directions M1-M8 is respectively compared with the background average value so as to find out an edge direction with a larger difference to determine in auxiliary way the representing direction. In another embodiment, the representing value of the background pixels can be the average value of eight pixels outside the eight edge directions M1-M8. Moreover, a threshold value can be set to determine which difference between the edge and the background is large enough to be considered.

Further step S246 is performed that median values of the pixels of the current frame F3 and the reference frames F1, F2 and F4 on the representing direction M1. In more details, first step S246a is performed that a plurality of effective points on the representing direction M1 are found out according to the edge map. For example, the number of the effective points in FIG. 3 is five and the number in FIG. 6 is three. Next, step S246b is performed that the pixels corresponding to the effective points of the current frame F3 and the reference frames F1, F2 and F4 are respectively calculated and the results serve as the directional median filtering value of each the frame. Taking FIG. 6 as an example, each the result is the median value of three pixels on the horizontal direction, in which the median values of the current frame F3 and the reference frames F1, F2 and F4 are respectively notated as Median3, Median1, Median2 and Median4.

Then, step S248 is performed that the replacement result is determined according to the median values Median1, Median2, Median3 and Median4. In more details, first step S248a is performed that a background average value of the pixels outside the representing direction M1 of each of the current frame F3 and the reference frames F1, F2 and F4 is respectively calculated. Taking FIG. 6 as an example, the background average value is calculated by using 23 pixels among all the pixels except for the three pixels on the representing direction M1. The background average values of the current frame F3 and the reference frames F1, F2 and F4 are respectively notated as Mean3, Mean1, Mean2 and Mean4. For example, in FIG. 3, 20 pixels in total except for the five pixels on the representing direction M1 are used to calculate the background average value of a frame, and analogically for the others.

After that, step S248b is performed that a difference value between the median values Median1, Median2, Median3 and Median4 and the background average values Mean1, Mean2, Mean3 and Mean4 are respectively calculated, and the difference values of the current frame F3 and the reference frames F1, F2 and F4 are notated as Diff3, Diff1, Diff2 and Diff4:

$$Diff1=abs(Mean1-Median1);$$

$$Diff2=abs(Mean2-Median2);$$

$$Diff3=abs(Mean3-Median3);$$

$$Diff4=abs(Mean4-Median4).$$

Further, step S248c is performed that a weighting value of each of the current frame F3 and the reference frames F1, F2 and F4 is respectively calculated according to the difference values Diff3, Diff1, Diff2 and Diff4. An edge with a higher contrast and more distinct look should be assigned with a larger weighting value, so that the larger the difference value, the higher the weight is during weighting average operation; that is, the difference values and the weighting values have positive proportional relationship with each other. The weighting values of the current frame F3 and the reference frames F1, F2 and F4 are notated as W3, W1, W2 and W4.

Further, step S248d is performed that the median values Median1, Median2, Median3 and Median4 are weighted with the weighting values W1, W2, W3 and W4 so as to determine the replacement result. For example, the replacement result= (W1*Median1+W2*Median2+W3*Median3+ W4*Median4/(W1+W2+W3+W4). In another embodiment, if more-distinct pixels are desired but without the weighting processing, then the replacement result can be determined by the median of the median values Median3, Median1, Median2 and Median4. For example, the replacement result=Median(Median1, Median2, Median3, Median4).

Further, step S250 is performed that a pixel corresponding to the position of the target point T in an output image is generated according to the replacement result. For example, a blank image is firstly generated, followed by generating a pixel corresponding to the position of the target point T in the blank image according to the replacement result. Further, step S270 is performed that the mask M is moved and the method goes back to step S230.

Referring to FIG. 4 again, in contrary, when the pixel of the target point T of the current frame F3 is not located on the edge, step S260 is performed that a replacement result is calculated by using the pixels surrounding the target point T in the reference frames F1, F2, F4 and F5, in which the pixels surrounding the target point T are located at a same side of the edge. In more details, a median value of the pixels surrounding the target point T in each of the reference frames F1, F2, F4 and F5 is respectively calculated. Then, the replacement result is determined according to the calculated median values of the current frame F3 and the reference frames F1, F2, F4 and F5. That is to say, if the pulse noise to be processed is not on the edge map, a general median filter operation is performed. It should be noted that, during sequencing, only the pixels located at a same side as the target point T are considered, but the pixels located at the other side of the edge E are not adopted so as to avoid a wrong replacement result. At the time the replacement result is calculated directly by using a same weighting value assigned to every median value, i.e., the replacement result=(Median1+Median2+Median3+Median4+Median5)/5.

Further, step S250 is performed that a pixel corresponding to the position of the target point T in an output image is generated according to the replacement result. Further, step S270 is performed that the mask M is moved and the method goes back to step S230.

In summary, the invention is able to effectively eliminate the impulse noise on the edge and the smooth region. In addition, the invention is different from the conventional noise reduction method without judging the edge profile. The invention uses different strategy for dealing with the edge and the smooth region, which can achieve a better noise reduction result and keep the true detail instead of obtaining an indistinct image.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A method of multi-frame image noise reduction, suitable for an image-capturing device and comprising:
    obtaining a current frame and a plurality of reference frames;
    defining a mask and a target point in the mask, wherein a plurality of same positions of the current frame and the reference frames are marked by the mask after motion compensation is performed on the current frame and the reference frames;
    judging whether or not the pixel of the target point of the current frame is located on at least one edge of the current frame according to an edge map of the current frame, wherein the at least one edge comprises a first edge which is corresponding to a plurality of second edge of the reference frames, and each of the second edges is respectively located on each of the reference frames;
    when the pixel of the target point is located on the first edge, calculating a replacement result by using the pixels the reference frames respectively located on each of the second edges, wherein the pixels on the second edges in the references frames correspond to the same spatial position as the target point in the current frame;
    when the pixel of the target point is not located on the first edge, calculating a replacement result by using the pixels in the mask of each of the reference frames corresponding to pixels surrounding the target point and on a same side of the second edge as the target point location with respect to the first edge;
    generating a pixel corresponding to the position of the target point in an output image according to the replacement result; and
    moving the mask and going back to the step of judging whether or not the pixel of the target point of the current frame is located on the at least one edge,
    wherein the step of calculating the replacement result by using the pixels in the reference frames respectively located on each of the second edges comprises:
    determining a representing direction of the first edge and the second edges among a plurality of edge directions according to the contrast of the pixel of the target point over the adjacent pixels;
    respectively calculating a median value of the pixels of the current frame on the representing direction and calculating median values for each of the reference frames using the pixels of each of the reference frames on the representing direction; and
    determining the replacement result according to the median values.

2. The method of multi-frame image noise reduction as claimed in claim 1, further comprising:
    determining in an auxiliary way, the representing direction according to the contrast of a plurality of background pixels in the mask over the pixels on the edge directions in the mask.

3. The method of multi-frame image noise reduction as claimed in claim 1, wherein the step of determining the replacement result according to the median values comprises:
    respectively calculating a background average value of the pixels outside the representing direction of the current frame and the reference frames;
    respectively calculating a difference value between the median values and the background average values;
    respectively calculating a weighting value of the current frame and the reference frames according to the difference values; and
    weighting the median values according to the weighting values so as to determine the replacement result.

4. The method of multi-frame image noise reduction as claimed in claim 3, wherein the difference values and the weighting values have positive proportional relationship with each other.

5. The method of multi-frame image noise reduction as claimed in claim 1, wherein the step of determining the replacement result according to the median values comprises:
   finding out the median of the median values to determine the replacement result.

6. The method of multi-frame image noise reduction as claimed in claim 1, wherein the step of respectively calculating the median values comprises:
   finding out a plurality of effective points on the representing direction according to the edge map; and
   respectively calculating the pixels at the effective points of the current frame and the reference frames to serve as the median values.

7. The method of multi-frame image noise reduction as claimed in claim 1, wherein the step of calculating the replacement result by using the pixels in the reference frames surrounding the target point comprises:
   respectively calculating a median value of the pixels surrounding the target point in the reference frames; and
   determining the replacement result according to the median values.

8. The method of multi-frame image noise reduction as claimed in claim 7, wherein the step of determining the replacement result according to the median values comprises:
   averaging the median values to determine the replacement result.

9. The method of multi-frame image noise reduction as claimed in claim 1, further comprising:
   judging whether or not the pixel of the target point of a first reference frame among the reference frames is located on one of the second edges, which is corresponding to the first reference frame, according to an edge map of the first reference frame; and
   discarding the first reference frame if the pixel of the target point of the first reference frame among the reference frames is not located on the one of the second edges, which is corresponding to the first reference frame.

* * * * *